(12) United States Patent
Äärilä et al.

(10) Patent No.: US 7,576,166 B2
(45) Date of Patent: Aug. 18, 2009

(54) PROCESS FOR THE PRODUCTION OF LINEAR LOW-DENSITY POLYETHYLENE COMPOSITION

(75) Inventors: Jari Äärilä, Porvoo (FI); Irene Helland, Porsgrunn (NO); Ole Jan Myhre, Porsgrunn (NO); Jorunn Nilsen, Porsgrunn (NO); Markku Vahteri, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 565 days.

(21) Appl. No.: 10/519,326

(22) PCT Filed: Jun. 19, 2003

(86) PCT No.: PCT/FI03/00500

§ 371 (c)(1),
(2), (4) Date: Jul. 14, 2005

(87) PCT Pub. No.: WO04/000902

PCT Pub. Date: Dec. 31, 2003

(65) Prior Publication Data

US 2006/0167192 A1    Jul. 27, 2006

(30) Foreign Application Priority Data

Jun. 20, 2002  (EP) ................... 02396098

(51) Int. Cl.
*C08L 23/04*    (2006.01)
*C08F 297/08*   (2006.01)
*C08J 5/18*     (2006.01)

(52) U.S. Cl. ...................... 526/348.1; 526/65; 526/348; 525/53; 525/240

(58) Field of Classification Search ............ 525/53, 525/240; 526/65, 348, 348.1
See application file for complete search history.

(56) References Cited

U.S. PATENT DOCUMENTS 5,326,835 A    7/1994   Ahvenainen et al. .......... 526/64

FOREIGN PATENT DOCUMENTS

| EP | 0692515 A1 | 1/1996 |
| WO | WO 99/58583 | 5/1999 |
| WO | WO 00/40620 | * 7/2000 |

OTHER PUBLICATIONS

International Search Report, dated Sep. 26, 2003, 4 pages PCT/FI03/00500.
International Preliminary Examination Report, dated Jul. 2, 2004, 7 pages PCT/FI03/00500.

* cited by examiner

*Primary Examiner*—Roberto Rábago
(74) *Attorney, Agent, or Firm*—Ohlandt, Greeley, Ruggiero & Perle, L.L.P.

(57) ABSTRACT

A process for producing bimodal linear low-density polyethylene polymer compositions, useful for making films. The polymer compositions have a melt flow rate $MFR_2$ of 0.4 to 1.0 g/10 min and a density of 918 to 925 kn/m$^3$. The process to produce the polymer compositions involves copolymerizing ethylene with an alpha-olefin comonomer in a loop reactor to produce a low molecular weight polymer having a melt flow rate $MFR_2$ of 50 to 500 g/10 min and a density of 945 to 953 kg/m$^3$. The polymerization is continued in a gas phase reactor to produce a high molecular weight polymer, such that the final polymer composition has the desired properties. The final composition contains from 41 to 48% by weight of the low molecular weight polymer and from 59 to 52% by weight of the high molecular weight polymer. The resulting films have an excellent visual appearance and good mechanical properties. The compositions can easily be converted to films. The process can be operated a long time without a shutdown.

4 Claims, No Drawings

PROCESS FOR THE PRODUCTION OF LINEAR LOW-DENSITY POLYETHYLENE COMPOSITION

BACKGROUND OF THE INVENTION

1. Field of the Invention

The present invention concerns a process for the production of bimodal linear low-density polyethylene compositions. In addition, the present invention concerns bimodal linear low-density polyethylene compositions and films prepared thereof. In particular, the present invention relates to bimodal films having an improved balance between the mechanical properties and proccessability.

2. Description of Related Art

The proccessability on a film blowing line and the physical properties of the final film depend largely on the polymer structure, especially on the molecular weight distribution (MWD). If the polymer is bimodal, i.e., if the MWD is broad, the polymer can be expected to exhibit a good proccessability. Other important properties, which naturally depend on the application the polymer material is used in, comprise mechanical properties.

Films prepared from linear low-density polyethylene (PE-LLD) having a bimodal molecular weight distribution are known from prior art. The polymers are usually produced by polymerisation of ethylene and alpha-olefin comonomers in the presence of a polymerisation catalyst in two cascaded reactors.

Such films and methods of their preparation are known, e.g. from EP-A-692515, EP-A-691367, EP-A-773257, EP-A-57891 and WO-A-9618662.

EP-A-692515 discloses a film extruded from in-situ blend of polymers. The examples show that the low molecular weight component has an $MFR_2$ of about 400 g/10 min and density of about 945 kg/m$^3$. The high molecular weight component has an $MFR_{21}$ of 4.4-5.4 g/10 min and density 901-902 kg/m$^3$. The final polymer has $MFR_2$ of 0.7-1.3 g/10 min, density of 926-929 kg/m$^3$ and split 47/53-45/55. The polymerisation is conducted in two cascaded gas phase reactors. The material is especially useful in biaxially oriented films.

EP-A-691367 discloses films extruded from bimodal linear low-density polyethylene. The low molecular weight component has an $MFR_2$ of 500-700 g/10 min and density of 929-934 kg/m$^3$. The final polymer has $MFR_{21}$ of 8-14 g/10 min, a density of 918-926 kg/m$^3$ and a split of 40/60-36/64. The resulting films have a low blocking tendency, good proccessability and good mechanical properties (especially dart drop).

EP-A-773257 discloses shrink films made of in-situ blends of ethylene polymers. The blend has $MFR_2$ of 0.7 g/10 min, $FRR_{21/2}$ of 98 and density of 922 kg/m$^3$. No data was given for low molecular weight and high molecular weight components. Split was 53/47.

EP-A-57891 discloses ethylene polymer compositions suitable for making films. The materials have a melt flow rate $MFR_2$ of 0.2 to 10 g/10 min and density of 916 to 929 kg/m$^3$. The films were reported to have a good mechanical strength. The polymer compositions were produced by melt blending, cascade slurry polymerisation or cascade solution polymerisation.

WO-A-9618662 discloses a process to produce ethylene polymers, by polymerising in a cascade of a prepolymerisation reactor, a loop reactor and a gas phase reactor. The resulting bimodal polymer had a melt flow rate $MFR_{21}$ of 14 to 17 g/10 min and density of 923 to 925 kg/m$^3$.

While the above documents disclose different film materials and manufacturing processes, a process for preparing a bimodal linear low-density polyethylene material suitable for film purposes, which material has good flow properties and good mechanical strength together with a good visual appearance, and which process is able to operate a long time in a stable manner is desired.

SUMMARY OF THE INVENTION

It is an object of the present invention to provide an improved process for producing suitable low-density polyethylene materials for the production of films.

These and other objects, together with the advantages thereof over known processes and products, which shall become apparent from the specification, which follows, are accomplished by the invention as hereinafter described and claimed.

The present invention is based on the provision of bimodal polyethylene compositions comprising
- a first component having a low molecular weight with a melt flow rate $MFR_2$ of 150 to 500 g/10 min, preferably of 200 to 400 g/10 min and a density of 940 to 955 kg/m$^3$, preferably 945 to 953 kg/m$^3$, the first component being present in the composition in an amount of 41 to 48% by weight,
- at least one other component having a higher molecular weight a lower melt flow rate and a lower density than the said first component, the second component being present in the composition in an amount of 52 to 59% by weight, said composition having a melt flow rate in the range $MFR_2$ of 0.4 to 1.0 g/10 min g/10 min, preferably 0.4 to 0.7 g/10 min and a density of 918 to 925 kg/m$^3$.

The said composition for making polyethylene films is produced by polymerising or copolymerising ethylene in a reactor cascade formed by at least a first reactor and a second reactor, where at least the first reactor is a loop reactor and at least the second reactor is a gas phase reactor. Preferably, the polymerisation takes place in the presence of a catalyst, which has been prepared by supporting a magnesium compound, an aluminium compound and a titanium compound on a silica support having an average particle size between 15 and 30 μm.

Considerable advantages are obtained by means of the present invention. The present process enables the preparation of resins having good flow properties, resulting to a high throughput and stable behaviour on the film line. The film has good mechanical properties, almost matching those of the bimodal high molecular weight resins, and a good visual appearance, meaning a low number of gels or fisheyes.

Moreover, the process is capable of operating long periods in a stable manner without the need for process shutdowns. Especially, the amount of fine polymer (having a particle size of less than 105 μm) produced in the process is low.

The thus produced composition for films may be used for producing both blown and cast films. It is, however, particularly suitable for film blowing, with the improved properties.

Next, the invention will be more closely examined with the aid of the following detailed description and examples.

DETAILED DESCRIPTION OF THE INVENTION

Definitions

For the purpose of the present invention, "slurry reactor" designates any reactor operating in slurry, in which reactor the polymer forms in particulate form. As examples of suitable reactors can be mentioned a continuous stirred tank reactor, a batch-wise operating stirred tank reactor or a loop reactor. According to a preferred embodiment the slurry reactor comprises a loop reactor.

By "gas phase reactor" is meant any mechanically mixed or fluidised bed reactor. Preferably the gas phase reactor comprises a fluidised bed reactor with gas velocities of at least 0.2 m/sec, which may further have a mechanical agitation.

By "melt flow rate" or abbreviated "MFR" is meant the weight of a polymer extruded through a standard cylindrical die at a standard temperature (190° C. for polyethylene) in a laboratory rheometer carrying a standard piston and load. MFR is a measure of the melt viscosity of a polymer and hence also of its molecular weight. The abbreviation "MFR" is generally provided with a numerical subscript indicating the load of the piston in the test. Thus, e.g., $MFR_2$ designates a 2.16 kg load. MFR can be determined using, e.g., by one of the following tests: ISO 1133 C4, ASTM D 1238 and DIN 53735.

By "split" or "reaction spit" is here meant the weight ratio of the low molecular weight polymer to the high molecular weight polymer.

By "average particle size" is here meant the volume average particle size.

Polymerisation Catalyst

The polymerisation catalyst is a so-called Ziegler-Natta catalyst. Preferably, the polymerisation catalyst contains a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has an average particle size from 15 to 30 µm, preferably from 18 to 25 µm. Especially it has been found out that the average particle size of the polymer produced in the process of the invention is the same irrespective whether the catalyst is prepared on a 20 µm support or on a 40 µm support. In fact, the fraction of fine polymer particles has been found to be lower if a support having an average particle size of 20 µm is used. The reduction of the fine polymer reduces the risk of plugging and thus contributes to a stable process operation. This, on the other hand, helps to produce polymer films with a good homogeneity. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794. Alternatively, it can be prepared by first preparing a solution from the components and then contacting the solution with a carrier, as described in WO-A-01/55230.

The above mentioned solid catalyst component is contacted with an aluminium alkyl cocatalyst, which preferably is an aluminium trialkyl compound, after which it can be used in polymerisation. The contacting of the solid catalyst component and the aluminium alkyl cocatalyst can either be conducted prior to introducing the catalyst into the polymerisation reactor, or it can be conducted by introducing the two components separately into the polymerisation reactor.

Polymerisation Process

To produce the polymer compositions according to the invention, ethylene is polymerised in the presence of a polymerisation catalyst at elevated temperature and pressure. Polymerisation is carried out in a series of polymerisation reactors selected from the group of slurry and gas phase reactors. In the following, the reactor system comprises one loop reactor (referred to as "the first reactor") and one gas phase reactor (referred to as "the second reactor"), in that order.

However, it should be understood that the reactor system can comprise other reactors in addition to the first and the second reactor. Thus, it is possible to include reactors, e.g. for prepolymerisation, or to divide either one of the reactors in two or more reactors.

A separation stage is normally needed between the reactors to prevent the carryover of reactants from the first polymerisation stage into the second one. The separation stage is typically conducted at a lower pressure than the first polymerisation stage. Thus, at least the majority of the volatile components and in particular a major part of hydrogen is separated from the polymer stream in the separation stage.

The catalyst used in the polymerisation process is a Ziegler-Natta catalyst. According to a preferred embodiment, no fresh catalyst is added to the second polymerisation stage.

In every polymerisation step it is possible to use also comonomers selected from the group of $C_{3-18}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof.

In addition to the actual polymerisation reactors used for producing the bimodal ethylene homo- or copolymer, the polymerisation reaction system can also include a number of additional reactors, such as prereactors. The prereactors include any reactor for prepolymerising the catalyst and for modifying the olefinic feed, if necessary. All reactors of the reactor system are preferably arranged in series (in a cascade).

According to a preferred embodiment of the invention, the polymerisation comprises the steps of:
(i) subjecting ethylene, hydrogen and comonomers to a first polymerisation or copolymerisation reaction in the presence of the polymerisation catalyst in a first reaction zone in a loop reactor to produce a first polymerisation product having a low molecular weight with a melt flow rate $MFR_2$ of 50 to 500 g/10 min, preferably of 100 to 400 g/10 min and a density of 940 to 955 kg/m³, preferably 945 to 953 kg/m³, (ii) recovering the first polymerisation product from the first reaction zone,
(iii) feeding the first polymerisation product to a second reaction zone or reactor,
(iv) feeding additional ethylene, comonomers and optionally hydrogen to the second reaction zone in a gas phase reactor,
(v) subjecting the additional ethylene and additional monomer(s) and optionally hydrogen to a second polymerisation reaction in the presence of the said polymerisation catalyst and the first polymerisation product,
(vi) to produce a polymer composition comprising from 41 to 48% by weight of the low molecular weight polymer produced in step (i), and from 59 to 52% by weight of the high molecular weight component produced in step (v),
(vii) the composition having a melt flow rate in the range $MFR_2$ of 0.4 to 1.0 g/10 min g/10 min, preferably 0.4 to 0.7 g/10 min and a density of 918 to 925 kg/m$^3$, and
(viii) recovering the combined polymerisation product from the second reaction zone.

In the first step of the process, ethylene with the comonomer(s) is fed into the first polymerisation reactor. Along with these components is fed also hydrogen, which functions as a molecular weight regulator. The amount of hydrogen depends on the desired molecular weight of the polymer. The catalyst may be fed to the reactor together with the reagents or, preferably, in a separate stream, normally by flushing with a diluent.

The polymerisation medium typically comprises the monomer (i.e. ethylene) and/or a hydrocarbon, in particular, a light inert hydrocarbon, such as propane, isobutane, n-butane or isopentane. The fluid is either liquid or gaseous. In the case of a loop reactor, the fluid is liquid and the suspension of polymer is circulated continuously through the slurry reactor, whereby a suspension of polymer in particle form in a hydrocarbon medium or monomer will be produced.

The conditions of the loop reactor are selected so that 41-48 wt-%, preferably 43-47 wt-%, of the whole production is polymerised in the loop reactor(s). The temperature is in the range of 40 to 110° C., preferably in the range of 70 to 100° C. The reaction pressure is in the range of 25 to 100 bar, preferably 35 to 80 bar. The mole fraction of ethylene in the reaction mixture is typically of 4 to 10%, preferably of 5 to 9%. The ratio of the alpha-olefin comonomer to ethylene depends on the density of the polymer that is produced in the first stage; typically it is of 250 to 800 mol/kmol, preferably of 400 to 800 mol/kmol. Hydrogen is also fed into the first reactor to control the molecular weight (or melt flow rate) of the polymer. The exact ratio of hydrogen to ethylene depends on the desired melt flow rate of the polymer to be produced; typically it is of 100 to 600 mol/kmol, preferably of 150 to 400 mol/kmol.

Heat of polymerisation is removed by cooling the reactor with a cooling jacket. The residence time in the slurry reactor must be at least 10 minutes, preferably 40-80 min for obtaining a sufficient degree of polymerisation.

After the first reaction zone at least part of the volatile components of the reaction medium are evaporated. As a result of the evaporation, at least the major part of hydrogen is removed from the product stream. The product stream is then subjected to a second polymerisation stage in the gas phase reactor in the presence of additional ethylene to produce a high molecular weight polymer.

The second reactor is a gas phase reactor, wherein ethylene, comonomers and preferably hydrogen are polymerised in a gaseous reaction medium in the presence of the polymerisation catalyst.

The gas phase reactor can be an ordinary fluidised bed reactor, although other types of gas phase reactors can be used. In a fluidised bed reactor, the bed consists of the formed and growing polymer particles as well as still active catalyst that enters the reactor with the polymer stream. The bed is kept in a fluidised state by introducing gaseous components, for instance monomer and comonomer(s) from the bottom of the reactor on such a flow rate that the particles are supported but not entrained by the gas stream. The fluidising gas can contain also inert gases, like nitrogen and propane and also hydrogen as a molecular weight modifier. The fluidised bed gas phase reactor can be equipped with a mechanical mixer.

The gas phase reactor can be operated in the temperature range of 50 to 115° C., preferably between 60 and 100° C. and the reaction pressure between 10 and 40 bar and the partial pressure of ethylene between 2 and 20 bar, preferably 3-8 bar.

The production split between the low molecular weight polymerisation reactor and the high molecular weight polymerisation reactor is (41 to 48%): (59 to 52%), based on the weight of the polymer composition. Preferably, 43 to 47 wt- of the ethylene copolymer is produced at conditions to provide a polymer having an $MFR_2$ of 50 to 500 g/10 min, preferably of 100 to 400 g/10 min and a density 940 to 955 kg/m$^3$, preferably 945 to 953 kg/m$^3$. Respectively, it is preferred that 53 to 57% of the ethylene copolymer is produced at conditions to provide the high molecular weight polymer, having been produced in such conditions that the final polymer composition has an $MFR_2$ of 0.4 to 1.0 g/10 min g/10 min, preferably 0.4 to 0.7 g/10 min and a density of 918 to 925 kg/m$^3$.

As mentioned above, the ratio of comonomer to ethylene in the second reactor is selected so that the final polymer composition has the desired density. A suitable range is 500 to 900 mol/kmol, preferably 500 to 800 mol/kmol.

In a similar fashion, the ratio of hydrogen to ethylene in the second reactor is selected so that the final polymer composition has the desired melt flow rate. A typical range is 1 to 30 mol/kmol, preferably 3 to 20 mol/kmol.

The present copolymers of ethylene can be blended and optionally compounded with additives and adjuvants conventionally used in the art. Thus, suitable additives include antistatic agents, flame retardants, light and heat stabilisers, pigments, processing aids and carbon black. Fillers such as chalk, talc and mica can also be used.

The present copolymers of ethylene can also be blended with other polymers, if so desired. Thus, it may be blended with low-density polyethylene produced in a high-pressure process or polar ethylene copolymers, for instance. It may also blended with other linear polyethylenes, or other polyolefins, such as polypropylene.

Film Preparation

The polymers produced according to the above-specified process can be converted into thin-gauge films in conventional film lines, in particular in blown film lines. They are useful also for oriented films etc.

The polymers produced by the process according to the present invention are especially suitable for producing blown films in so-called 'low neck' conditions. The values of blow-up ratio and frost line height depend on the type and size of the film line, but for a machine with a die diameter of 250 mm, die gap of 1 mm and throughput of about 85 kg/h the blow-up ratio can be about 4:1 and frost line height about 500 mm. These values are in no way limiting the present invention, but are only presented to give an indication of what is meant with 'low-neck' conditions.

The films according to the present invention have good mechanical properties, including moderate dart drop impact strength and good tear strength in both directions, in combination with an excellent homogeneity (low number of gels or fish-eyes).

The dart drop impact strength value of the films depends strongly on the film preparation conditions. Therefore, if a film is prepared with a 'high neck' (high value of frost line height), it has higher dart drop than if the same polymer were run in a film line with a 'low neck'. Also, the thickness of the film influences the result. However, 40 μm films of the present invention have a dart drop of 100 g at least, preferably 150 g at least.

The films of the present invention also have high tear strength, both in machine (MD) and transverse (TD) directions. Thus, the tear strength for 40 μm films according to the present invention is at least 1.5 N, preferably at least 2.0 N in the machine direction and at least 6 N, preferably at least 7.5 N in the transverse direction.

The number of gels (or fish-eyes) usually indicates the homogeneity of the films per a standard film area. The word 'gel' is in this context used to denote visually detectable, distinct small irregularities in the film. If cut out of the film and analysed, the gels usually are found to have a higher molecular weight than the film matrix. The films according to the present invention should not have gels, which are larger in size than 0.4 mm.

Description of Analytical Methods

Average Particle Size

The volume (or weight) average particle size of support material, catalyst and polymer was analysed with Coulter LS Particle Size Analyser.

Density

Density was determined from compression moulded specimen at 23° C. in a water bath according to an ultrasound measurement method using Tecrad DS 500 equipment. The method was calibrated with samples having a density determined according to ISO 1183.

Melt Flow Rate

The melt flow rate of the polymer was determined according to ISO 1133 at 190° C. The load was indicated as a subscript, e.g. $MPR_{21}$ was determined under 21.6 kg load.

Dart Drop

Dart drop is measured using ISO 7765-1 method.

Gel Count

The gel count was determined by placing a film size of A4 size (210×297 mm) in a scanner, which detects and classifies the gels in three categories according to their size: 0.2-0.4 mm, 0.4-0.7 mm and larger than 0.7 mm. The thus obtained numbers are then recalculated to indicate the number of gels per square meter.

Tensile Strength

The experiment is performed according to ISO 1184 method. The specimen is extended along its major axis at a constant speed. Normal 50 mm could be used as a distance between grips (gauge length) in film tensile testing. 125 mm gauge length would be required for tensile modulus measurement so this was not possible for 100 mm cast film in transverse direction.

Tear Strength

Tear testing is done according to ASTM 1922. Machine direction is easier, as the thickness variation in critical test direction is better controlled. Thickness varies more in transverse direction and occasionally difficulties arise in taking the sample in a manner, which guarantees an even thickness for the critical testing area.

The invention is further illustrated with the aid of the following examples.

EXAMPLE 1

Preparation of the Catalyst

Complex Preparation:

87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg $TiCl_4$ was added during 0.5 hours at 45° C. The slurry was stirred at 40° C. for five hours. The catalyst was then dried by purging with nitrogen.

EXAMPLE 2

Into a 500 $dm^3$ loop reactor, operated at 85° C. temperature and 60 bar pressure, was continuously introduced propane diluent, ethylene, hydrogen and 1-butene comonomer in such flow rates that ethylene content in the reaction mixture was 6.7 mol- %, the mole ratio of hydrogen to ethylene was 240 mol/kmol and the mole ratio of 1-butene to ethylene was 550 mol/kmol. At the same time into the reactor was continuously introduced a polymerisation catalyst prepared according to Example 1 and triethylaluminium cocatalyst in such quantities that ethylene polymer was produced at a rate of 30 kg/h. The molar ratio of aluminium of the cocatalyst to titanium of the catalyst was 20. The polymer had an $MFR_2$ of 300 g/10 min and density of 951 $kg/m^3$.

The polymer was withdrawn from the loop reactor by using settling legs, and the polymer slurry was introduced into a flash tank operated at 3 bar pressure and 20° C. temperature.

From the flash tank the polymer was introduced into a fluidised bed gas phase reactor, which was operated at 80° C. temperature and 20 bar pressure. Into the gas phase reactor were additional ethylene, hydrogen and 1-butene introduced, as well as nitrogen flushes to keep the connections and piping open. Consequently, the concentration of ethylene in the reactor gas was 19 mol- %, the molar ratio of hydrogen to ethylene was 7 mol/kmol and the molar ratio of 1-butene to ethylene was 650 mol/kmol. The polymer was withdrawn from the reactor at a rate of 67 kg/h. After collecting the polymer it was blended with additives and extruded into pellets in a counter-rotating twin-screw extruder JSW CIM90P. The resulting polymer had an $MFR_2$ of 0.61 g/10 min and density of 923 $kg/m^3$. The split between the polymer produced in the loop reactor and the polymer produced in the gas phase reactor was 45/55.

EXAMPLE 3

The procedure of Example 2 was repeated, with the exception that the ethylene concentrations, hydrogen to ethylene ratios and 1-butene to ethylene ratios were changed according to the Table 1. The polymer characteristics can also be found in Table 1.

EXAMPLE 4

The procedure of Example 2 was repeated, with the exception that the ethylene concentrations, hydrogen to ethylene ratios and 1-butene to ethylene ratios were changed according to the Table 1. The polymer characteristics can also be found in Table 1.

EXAMPLE 5

The procedure of Example 2 was repeated, with the exception that the ethylene concentrations, hydrogen to ethylene ratios and 1-butene to ethylene ratios were changed according to the Table 1. The polymer characteristics can also be found in Table 1.

COMPARATIVE EXAMPLE 1

The procedure of Example 1 was repeated, with the exception that the ethylene concentrations, hydrogen to ethylene ratios and 1-butene to ethylene ratios were changed according to Table 1. Also, a polymerisation catalyst prepared according to Example 3 of EP-A-699794 (having average particle size of 40 μm) was used.

TABLE 1

| | Example | | | | |
|---|---|---|---|---|---|
| | 2 | 3 | 4 | 5 | CE1 |
| Ethylene concentration in loop reactor, mol-% | 6.7 | 6.7 | 6.8 | 6.4 | 6.7 |
| Hydrogen to ethylene ratio in loop reactor, mol/kmol | 240 | 235 | 150 | 150 | 265 |
| 1-butene to ethylene mole ratio in loop reactor, mol/kmol | 550 | 570 | 720 | 730 | 514 |
| Polymer production rate in loop reactor, kg/h | 30 | 25 | 25 | 28 | 26 |
| MFR$_2$ of polymer produced in loop reactor, g/10 min | 300 | 300 | 90 | 100 | 580 |
| Density of polymer produced in loop reactor, kg/m$^3$ | 951 | 951 | 946 | 946 | 951 |
| Ethylene concentration in gas phase reactor, mol-% | 19 | 19 | 22 | 20 | 7.8 |
| Hydrogen to ethylene ratio in gas phase reactor, mol/kmol | 7 | 3 | 11 | 4 | 7 |
| 1-butene to ethylene mole ratio in gas phase reactor, mol/kmol | 650 | 645 | 650 | 580 | 460 |
| Average particle size of the powder, mm | ND | 0.38 | 0.46 | ND | 0.36 |
| MFR$_2$ of the final polymer, g/10 min | 0.61 | 0.47 | 0.66 | 0.45 | 0.21 |
| Density of the final polymer, kg/m$^3$ | 923 | 922 | 924 | 924 | 924 |
| Split, loop/gpr | 45/55 | 45/55 | 47/53 | 48/52 | 43/57 |

ND denotes that the respective property has not been determined

It is worth noting that in the process of the present invention the average size of the polymer particles is comparable to that produced in the Comparative Example, even though the initial size of the catalyst was only 50% of that of the Comparative Example. In fact, in the process of the present invention the fraction of both fine polymer particles and very large polymer particles has decreased, and therefore it produces a polymer having a narrow particle size distribution.

EXAMPLE 6

Polymers of Examples 2 to 5 and Comparative Example 1 were blown to a film on a Reifenhäuser KK2 film blowing line. The polymer was extruded with a single-screw extruder with a 70 mm screw diameter through an annular die having 250 mm diameter and 1.0 mm die gap. The temperature at the die was 215° C. The output was 85 kg/h. The resulting film had a thickness of 40 μm. The blow-up ratio (BUR) was 2.5 and the frost line height (FLH) was 500 mm. The film properties can be found in Table 2.

It can be seen from the table, that the films prepared from the polymers obtained by using the process of the invention have improved homogeneity and tear resistance compared with a material having a lower MFR. As can be expected, the dart drop of the material produced according to the process of the invention is lower because of its lower molecular weight. Thus, the films of the invention are useful for applications requiring a good homogeneity (i.e., a low number of gels) and moderate mechanical strength.

TABLE 2

| | Polymer of Example | | | | |
|---|---|---|---|---|---|
| | 2 | 3 | 4 | 5 | CE1 |
| Dart drop, g | 158 | 168 | 147 | 170 | 309 |
| Tear resistance (MD), N | 2.8 | 3.5 | 2.9 | 2.2 | 0.7 |
| Tear resistance (TD), N | 8.9 | 9.4 | 8.8 | 9.4 | 4.3 |
| Tensile strength (MD), MPa | 43 | 44 | 46 | 46 | ND |
| Tensile strength (TD), MPa | 38 | 38 | 39 | 38 | ND |
| Number of gels of size 0.2-0.4 mm | ND | ND | ND | 16 | 53 |
| Number of gels of size 0.4-0.7 mm | ND | ND | ND | 0 | 3 |
| Number of gels of size larger than 0.7 mm | ND | ND | ND | 0 | 0 |

ND denotes that the respective property has not been determined

The invention claimed is:

1. A film made of linear low-density polyethylene, which polyethylene comprises
    (i) a low molecular weight component with a melt flow rate $MFR_2$ of 100 to 400 g/10 min and a density of 945 to 953 kg/m$^3$, and
    (ii) a high molecular weight component having a higher molecular weight, a lower melt flow rate and a lower density than the low molecular weight component (i), so that the polymer composition comprises from 41 to 48% by weight of the low molecular weight component (i), and from 59 to 52% by weight of the high molecular weight component (ii), and the composition has a melt flow rate $MFR_2$ in the range 0.4 to 1.0 g/10 min and a density of 918 to 925 kg/m$^3$, wherein said film has no gels having a size greater than 0.4 mm.

2. A film according to claim 1, wherein the film has a dart drop of at least 100 grams, tear strength in machine direction of at least 1.5 N and tear strength in transverse direction of at least 6 N.

3. A film according to claim 2, wherein the film has a dart drop of at least 150 grams, tear strength in machine direction of at least 2.0 N and tear strength in transverse direction of at least 7.5 N.

4. A film according to claim 1, wherein said linear low-density polyethylene has a melt flow rate $MFR_2$ of in the range 0.4 to 0.7 g/10 min.

* * * * *